United States Patent
Garg et al.

(10) Patent No.: US 11,972,400 B2
(45) Date of Patent: Apr. 30, 2024

(54) METHOD AND SYSTEM OF FASTER PROOF-OF-WORK IN DISTRIBUTED LEDGER

(71) Applicant: MASTERCARD INTERNATIONAL INCORPORATED, Purchase, NY (US)

(72) Inventors: Chandan Garg, Haryana (IN); Shubham Kumar, Haryana (IN); Nikhat Parveen, Uttar Pradesh (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 403 days.

(21) Appl. No.: 17/505,010

(22) Filed: Oct. 19, 2021

(65) Prior Publication Data
US 2023/0119902 A1    Apr. 20, 2023

(51) Int. Cl.
*G06Q 20/06* (2012.01)
*G06F 16/182* (2019.01)
*H04L 9/00* (2022.01)

(52) U.S. Cl.
CPC ......... *G06Q 20/065* (2013.01); *G06F 16/182* (2019.01); *H04L 9/50* (2022.05); *G06Q 2220/00* (2013.01)

(58) Field of Classification Search
CPC .............. G06Q 20/065; G06Q 2220/00; G06F 16/182; H04L 9/50
See application file for complete search history.

(56) References Cited

U.S. PATENT DOCUMENTS

| | | | |
|---|---|---|---|
| 11,770,256 B1* | 9/2023 | Carlson | G06F 21/76 |
| 2016/0358135 A1* | 12/2016 | Liao | G06Q 20/3827 |
| 2023/0033600 A1* | 2/2023 | Nelson | G07F 17/323 |

FOREIGN PATENT DOCUMENTS

CN    109218348 A  *  1/2019  ......... G06Q 20/401

* cited by examiner

*Primary Examiner* — Michael Simitoski
*Assistant Examiner* — Hany S. Gadalla
(74) *Attorney, Agent, or Firm* — Panitch Schwarze Belisario & Nadel LLP

(57) ABSTRACT

The present disclosure provides a description of exemplary systems and methods for enabling faster proof-of-work in a distributed ledger. The methods and systems may include a processor which may generate a first hash having a first difficulty level as a first proof of work associated with a first plurality of selected transactions. The first hash not being accepted by a distributed ledger network. The processor may receive a second plurality of selected transactions and determine a second difficulty level for a second proof of work associated with the second plurality of selected transactions. The processor may compare the first difficulty level to the second difficulty level. In response to determining that the first difficulty level is less than the second difficulty level, the processor may generate a second hash as a second proof-of-work for the second plurality of selected transactions having a residual difficulty level.

15 Claims, 5 Drawing Sheets

METHOD AND SYSTEM OF FASTER PROOF-OF-WORK IN DISTRIBUTED LEDGER

TECHNICAL FIELD

The present disclosure generally relates to proof-of-work in a distributed ledger, specifically enabling miners to use a previously unaccepted proof-of-work for a subsequent block of transactions in the distributed ledger.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing the possibility anonymity as to the individuals or entities involved in a transaction. New blocks are added to the blockchain through a process known as "consensus." In a traditional consensus process, blockchain nodes work to generate a new block that satisfies all requirements, a process known as "mining," and then will share the new block with other nodes. The other nodes will confirm that the block is suitable and then distribute the block throughout the blockchain, which effectively adds that block into the blockchain and moves the nodes on to working on consensus on the next block.

Blockchain nodes compete to solve a complex mathematical problem to "mine" a new block with the node that solves the complex mathematical problem first getting a reward. In current systems, all the work done by the remaining blockchain nodes, i.e., the ones which did not solve first, to solve the complex mathematical problem goes to waste. Thus, there is a need for a technical solution whereby the work done by the remaining nodes does not go to waste.

SUMMARY

The present disclosure provides a description of exemplary systems and methods for enabling faster proof-of-work in a distributed ledger. The methods and systems may include a processor which may generate a first hash having a first difficulty level as a first proof of work associated with a first plurality of selected transactions. The first hash not being accepted by a distributed ledger network. The processor may receive a second plurality of selected transactions and determine a second difficulty level for a second proof of work associated with the second plurality of selected transactions. The processor may compare the first difficulty level to the second difficulty level. In response to determining that the first difficulty level is less than the second difficulty level, the processor may generate a second hash as a second proof-of-work for the second plurality of selected transactions having a residual difficulty level. In response to determining that the first difficulty level is greater than or equal to the second difficulty level, the processor may generate a second hash as a second proof-of-work for the second plurality of selected transactions, wherein the second hash is generated using a header from the first proof of work as a nonce.

The present disclosure also provides a description of a method for enabling faster proof-of-work in a distributed ledger includes generating, by a first computing device, a first hash having a first difficulty level as a first proof of work associated with a first plurality of selected transactions, wherein the first hash is not accepted by a distributed ledger network. The method also includes receiving, by the first computing device, a second plurality of selected transactions; determining, by the first computing device, a second difficulty level for a second proof of work associated with the second plurality of selected transactions; comparing, by a processor of the first computing device, the first difficulty level to the second difficulty level; and in response to determining that the first difficulty level is less than the second difficulty level, generating, by the first computing device, a second hash as a second proof-of-work for the second plurality of selected transactions having a residual difficulty level.

The present disclosure further provides a description of a method for enabling faster proof-of-work in a distributed ledger includes generating, by a first computing device, a first hash having a first difficulty level as a first proof of work associated with a first plurality of selected transactions, wherein the first hash is not accepted by a distributed ledger network. The method also includes receiving, by the first computing device, a second plurality of selected transactions; determining, by the first computing device, a second difficulty level for a second proof of work associated with the second plurality of selected transactions; comparing, by a processor of the first computing device, the first difficulty level to the second difficulty level; and in response to determining that the first difficulty level is greater than or equal to the second difficulty level, generating, by the first computing device, a second hash for the second plurality of selected transactions.

The present disclosure also provides a description of a system for enabling faster proof-of-work in a distributed ledger includes one or more processors, one or more computer-readable memories, one or more computer-readable tangible storage devices, and instructions stored on at least one of the one or more storage devices for execution by at least one of the one or more processors via at least one of the one or more memories. The instructions include instructions to generate, by a first computing device, a first hash having a first difficulty level as a first proof of work associated with a first plurality of selected transactions, wherein the first hash is not accepted by a distributed ledger network; instructions to receive, by the first computing device, a second plurality of selected transactions; instructions to determine, by the first computing device, a second difficulty level for a second proof of work associated with the second plurality of selected transactions; instructions to compare, by a processor of the first computing device, the first difficulty level to the second difficulty level; and in response to determining that the first difficulty level is less than the second difficulty level, instructions to generate, by the first computing device, a second hash as a second proof-of-work for the second plurality of selected transactions having a residual difficulty level.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency or network. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof-of-work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Enabling Faster Proof-of-Work in a Distributed Ledger

Figure 1:
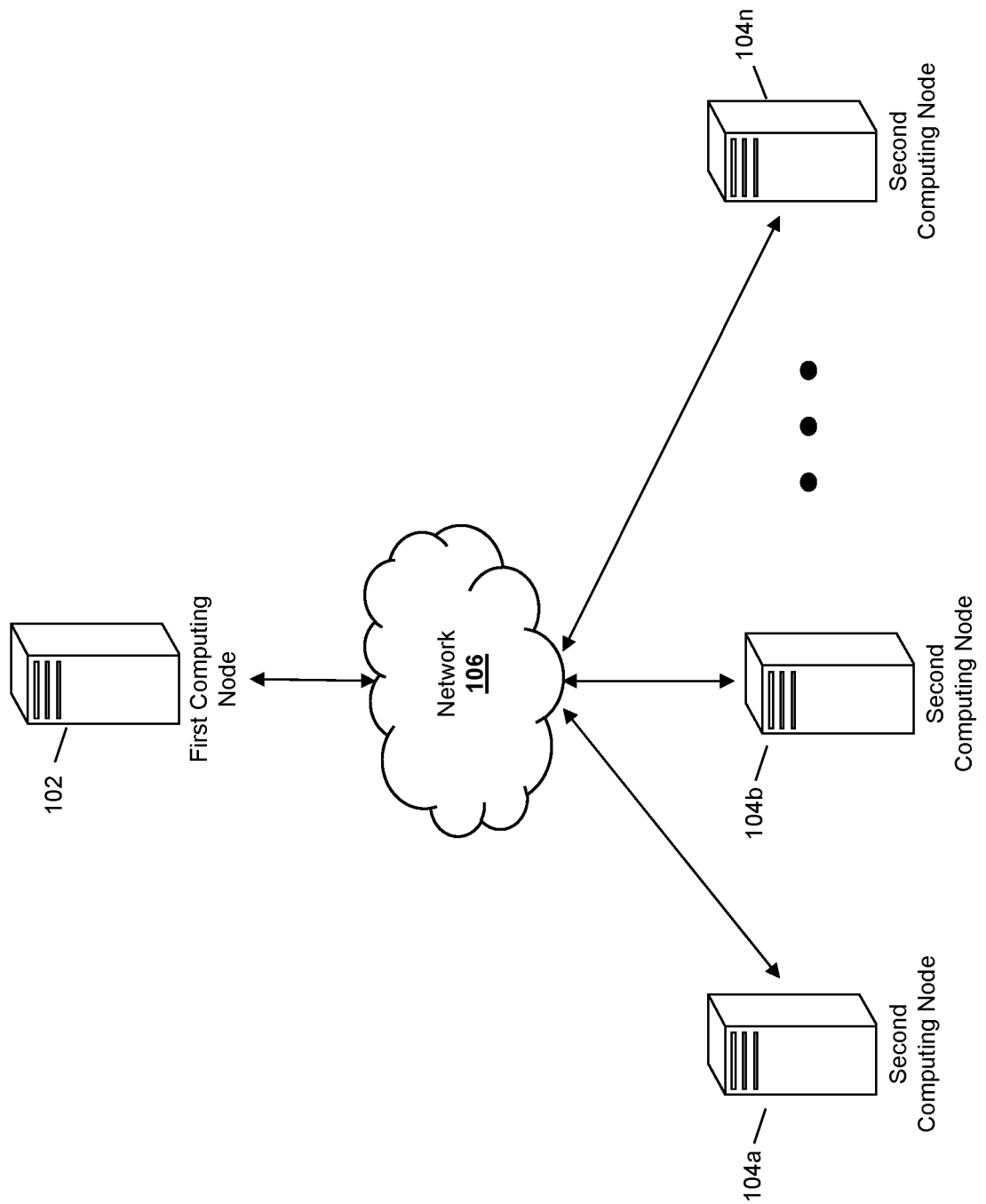
FIG. 1 is a block diagram illustrating a high level system architecture for enabling faster proof-of-work in a distributed ledger in accordance with exemplary embodiments.

FIG. 1 illustrates a 100 for system enabling faster proof-of-work in a distributed ledger.

In the system 100, a first computing node 102 and second computing nodes 104a-104n may communicate via a network 106. The first computing node 102 and the second computing nodes 104a-104n may be any type of computing system that is specially configured to perform the functions discussed herein, such as the computing system 200 illustrated in FIG. 2 or the computing system 400 illustrated in FIG. 4, as discussed in more detail below. Further, it can be appreciated that the first computing node 102 and the second computing nodes 104a-104n may include one or more computing devices.

In the system 100, the network 106 may be the Internet, representing a worldwide collection of networks and gateways to support communications between devices connected to the Internet. The network 106 may include, for example but not limited to, wired, wireless or fiber optic connections and mixtures thereof. In other embodiments, the network 106 may be implemented as an intranet, a local area network (LAN), a wide area network (WAN), or a personal area network (PAN). In general, the network 106 can be any combination of connections and protocols that will support communications between the first computing node 102 and the second computing nodes 104a-104n.

In an exemplary embodiment, the first computing node 102 and the second computing nodes 104a-104n may be part of a distributed ledger network, such as, but not limited to, a blockchain network, or any other distributed ledger network that utilizes a proof-of-work (PoW) protocol to validate data transactions and produce new blocks in a blockchain. While reference is made throughout to a blockchain network, it can be appreciated that the methods and systems discussed herein may be executed using any distributed ledger network. A PoW protocol is a consensus mechanism in which nodes in the blockchain network, called miner nodes, compete against each other to solve a complex mathematical problem by generating a hash with a defined difficulty for a block of data transactions. The miner node that transmits a correct hash, e.g., proof-of-work, to the network, e.g., the other nodes in the blockchain network, and receives consensus, e.g., fifty-one percent of the network validates the hash, wins and the block mined by that miner node is added onto the blockchain. The miner node that wins and gets a block added to the blockchain is rewarded with, for example, but not limited to, a monetary reward. The difficulty level associated with a proof-of-work, e.g., hash, is set by the blockchain network such that a new block is added to the blockchain at a desired interval, for example, every ten minutes. The difficulty level may be set by establishing a target for the hash such that the smaller the target, the harder the difficulty in generating a valid hash. For example, the difficulty level of a hash may be set by requiring a valid hash to start with a certain number of zeroes; thus, the more zeroes required, the lower the target and the harder it is for a miner node to generate a valid hash. Further, in order to generate a hash that contains the requisite number of leading zeroes requires the miner nodes must first generate a hash of the block of data transactions, append a nonce to the hashed block of data transactions, and then rehash the hash of hashed block of data transactions with the appended nonce. It is highly unlikely that the first nonce used by the miner node will result in a correct hash; thus, the miner nodes must try a large number of nonce options before they are able to generate a hash that meets the requirements of the target hash.

In exemplary embodiment of the system 100, the first computing node 102 and one or more of the second computing nodes 104a-104n are miner nodes in a blockchain network, e.g., the network 106, configured to post blockchain transactions and/or blocks of blockchain transactions to a blockchain associated therewith. In other embodiments, the first computing node 102 and one or more of the second computing nodes 104a-104n are configured to electronically communicate with an intermediate computing device, which may be a node of the network 106.

The first computing node 102 may select a first group of transactions from a blockchain network to mine into the next block to be added to the blockchain and the second computing device 104a may select a second group of transactions from a blockchain network to mine into the next block to be added to the blockchain. The first group of transactions selected by the first computing node 102 and the second group of transactions selected by the second computing device 104a may contain the same transactions, different transactions, and/or a mixture of the same and different transactions. The first computing node 102 and the second computing node 104a may each successfully solve the complex mathematical problem, e.g., generate correct hashes, for the first group of transactions and the second group of transactions, respectively. For example, the first computing node may generate a hash with the correct number of leading zeroes for the first group of transactions and the second computing node 104 may generate a hash with the correct number of leading zeroes for the second group of transactions. The first computing node 102 and the second computing node 104a may each transmit their respective solutions, e.g., hashes, to the other nodes of the blockchain network, e.g., second computing nodes 104b-104n, at substantially the same time. The remaining nodes, e.g., second computing nodes 104b-104n, will validate and accept one of the hashes, e.g., the hash generated by the second computing node 104a, and the block mined by the second computing node 104a will be added to the blockchain. The block mined by the first computing node 102 will not receive consensus and will not be added to the blockchain even though the first computing node 102 generated a valid hash for the first group of transactions.

After failing to achieve consensus on the first group of transactions, the first computing node 102 may select a third group of transactions from a blockchain network to mine into the next block to be added to the blockchain. In exemplary embodiments, because the first computing node 102 successfully solved a complex mathematical problem associated with a first group of transactions, the first computing node 102 will receive credit, e.g., a reward, for the previous proof-of-work transmitted by the first computing node 102. The reward will allow the first computing node 102 to receive credit for his previous work based on the difficulty level of the complex mathematical problem associated with the group of transactions being mined. Since the difficulty level of the complex mathematical problem can change overtime, the first computing node 102 will compare the difficulty level associated with its previous proof-of-work for the first group of transactions, e.g., a first difficulty level, to the difficulty level associated with the third group of transactions currently being mined, e.g., a second difficulty level.

In an exemplary embodiment, where the difficulty level has not changed, i.e., the first difficulty level is the same as the second difficulty level, or where the difficulty level has decreased, i.e., where the first difficulty level is the greater than the second difficulty level, the first computing node 102 may use information from the previous proof-of-work generated by the first computing node 102 to generate a new proof-of-work for the third group of transactions. In an exemplary embodiment, the first computing node may generate a hash for the third group of transactions and use a block header of the block storing the first group of transactions, e.g., the previous proof-of-work, in place of the nonce. Thus, the first computing node only needs to hash the third group of transactions and does not need to find a nonce that works. The resulting hash of the third group of transactions may not have the required number of leading zeros, but the second computing nodes 104a-n may verify that the first computing node 102 previously transmitted a correct hash for the first group of transactions based on the header transmitted in place of the nonce. For example, the nonce for the third group of transactions will be the block header of the first group of transactions, i.e., the proof-of-work for generated by the first computing node 102 for the first group of transaction and not accepted. The second computing nodes 104a-n will be able to go back to the block containing the group of first transactions, identified by the header, and verify that the proof-of-work was done and is correct for the first group of transactions.

In an exemplary embodiment, where the difficulty level has increased, i.e., the first difficulty level is the less than the second difficulty level, the first computing node 102 will solve a complex mathematical problem, e.g., generate a second hash, with a residual difficulty. The residual difficulty may be calculated for example, but not limited to, using the average hashpower associated with the first difficulty level and the average hashpower associated with the second difficulty level. Hashpower is the number of hashes per second a computing node is performing. A complex mathematical problem requires a computing node to use more hashpower as the difficulty rises. In one embodiment, the residual difficulty may be the difference between the average hashpower for a computing node in the blockchain at the first difficulty level and the average hashpower for a computing node in the blockchian network at the second difficulty level. For example, but not limited to, the average hashpower for a computing node at the first difficulty level may be 100 TeraHashes/second (TH/s) and the average hashpower for a computing node at the second difficulty level may be 250 TH/s; thus, the first computing node 102 would only need to solve a complex mathematical problem, e.g., generate a hash, with an average hashpower of 150 TH/s. In another embodiment, the residual difficulty may be the same as the first difficulty, which has a lower average hashpower than the second difficulty; thus, allowing the first computing node 102 to solve a complex mathematical problem that requires less computing power than the other computing nodes on the blockchain network, e.g., 150 TH/s less in the example above. Another way of quantifying hashpower is by the number of leading zeroes required in the hash by the blockchain network. The more leading zeroes required in the hash, the higher the average hashpower will be since more computing power will be required to find a correct hash. Following the examples above, in one embodiment, the residual difficulty may be the difference between the number of leading zeroes in a hash at the first difficulty level and the number of leading zeroes in a hash at the second difficulty level. For example, but not limited to, the number of leading zeroes in a hash at the first difficulty level may be four and the number of leading zeroes in a hash at the second difficulty level may be six; thus, the first computing node 102 would only need to generate a hash with two leading zeroes. In another embodiment, the residual difficulty may be the same as the first difficulty, which requires fewer leading zeroes than the second difficulty; thus, allowing the first computing node 102 to solve a complex mathematical problem that requires less computing power than the other computing nodes on the blockchain network, e.g., two fewer leading zeroes in the example above.

The first computing node 102 may transmit the second hash, e.g., second proof-of-work, to the other nodes of the blockchain network, e.g., the second computing nodes 104b-

104n, for validation. The remaining nodes, e.g., the second computing nodes 104b-104n, will validate and accept the second hash and the block mined by the first computing node 102 will be added to the blockchain.

Currently, when two or more computing nodes in a blockchain network successfully mine, e.g., generate a correct hash for, a block of transactions contemporaneously, only a single node will reach consensus and receive a reward for the work required in mining the block. Therefore, all the time and computing power spent by the remaining nodes whose work was not accepted, e.g., did not reach consensus, will go to waste. The methods and systems discussed herein allow for a computing node to receive credit, e.g., a reward, for the work done in correctly generating a hash for a block of transactions that was not accepted by the network. Exemplary embodiments allows a computing node of a blockchain network to mine a current block of transactions with a residual difficulty; the residual difficulty being a function of the difficulty level associated with a previous proof of work done by the computing node that did not reach consensus within the network and the difficulty associated with the current block of transactions. Thus, the methods and systems discussed herein provide a novel solution, not addressed by current technology, to allow computing nodes in a blockchain network to take advantage of previous correct proof-of-works that were not able to reach consensus. Further, the methods and systems herein provide for the further decentralization of a blockchain network by enabling computing nodes with lesser computing power to generate correct solutions; thus, enabling more computing nodes to be competitive in the mining of blockchain blocks.

Computing System

Figure 2:
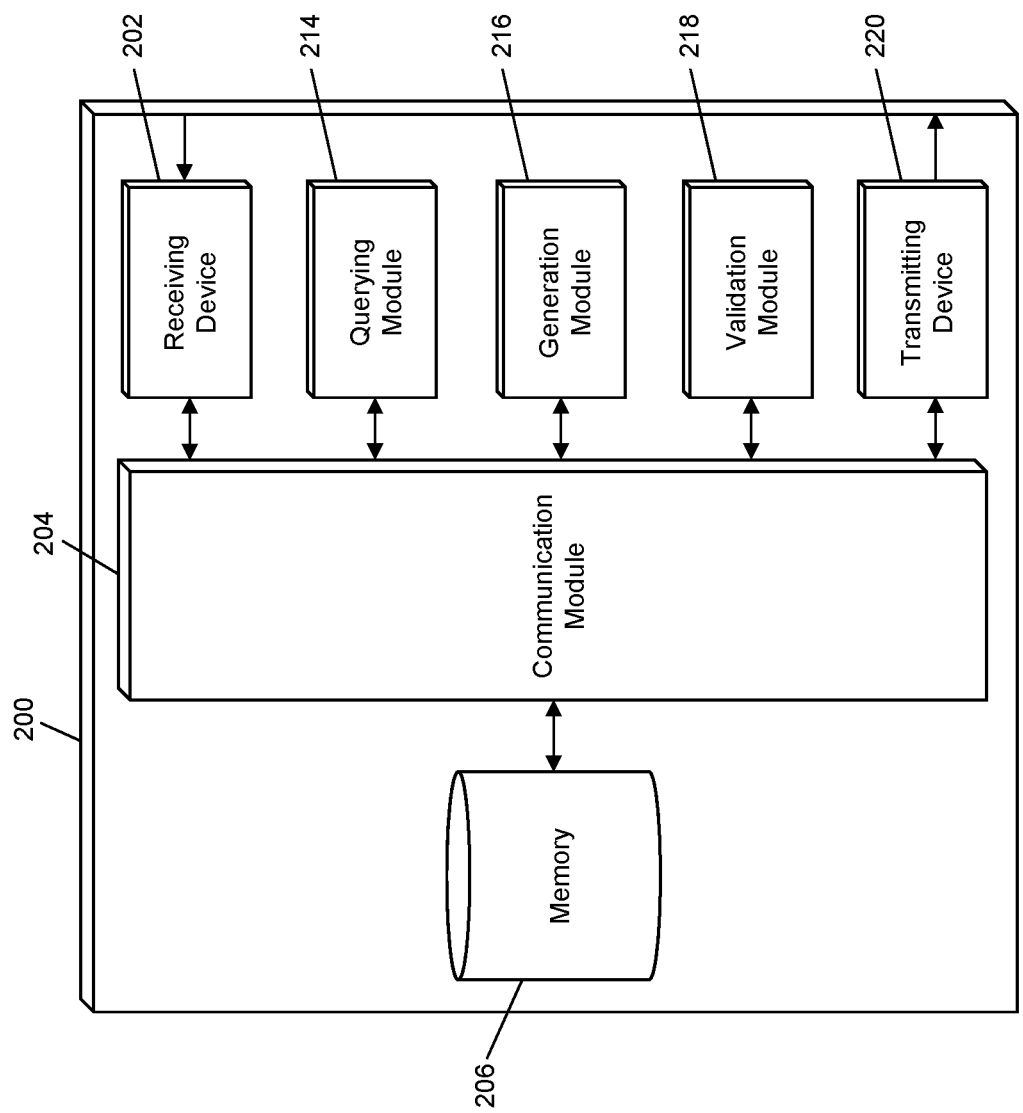
FIG. 2 is a block diagram illustrating a computing system of the system of FIG. 1 for enabling faster proof-of-work in a distributed ledger in accordance with exemplary embodiments.

FIG. 2 illustrates an embodiment of a computing system 200, such as may serve as the first computing node 102 and/or the second computing nodes 104a-n in the system 100. It will be apparent to persons having skill in the relevant art that the embodiment of the computing system 200 illustrated in FIG. 2 is provided as illustration only and may not be exhaustive to all possible configurations of the computing system 200 specifically configured for performing the functions as discussed herein. For example, the computer system 400 illustrated in FIG. 4 and discussed in more detail below may be a suitable configuration of the computing system 200.

The computing system 200 may include a receiving device 202. The receiving device 202 may be configured to receive data over one or more networks via one or more network protocols. In some instances, the receiving device 202 may be configured to receive data from the first computing node 102, the second computing nodes 104a-n, and other systems and entities via one or more communication methods, such as radio frequency, local area networks, wireless area networks, personal area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by the first computing node 102 that may be superimposed or otherwise encoded with one or more proofs-of-work, which may include a hash value with an associated difficulty, and data transactions associated with a blockchain network selected by the first computing node 102. The receiving device 202 may also be configured to receive data signals electronically transmitted by processing the second computing nodes 104a-n, which may be superimposed or otherwise encoded with one or more proofs-of-work, which may include a hash value with an associated difficulty, and data transactions associated with a blockchain network selected by the second computing nodes 104a-n.

The computing system 200 may also include a communication module 204. The communication module 204 may be configured to transmit data between modules, engines, databases, memories, and other components of the computing system 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing system 200 and external components of the computing system 200, such as externally connected databases, display devices, input devices, etc. The computing system 200 may also include a processing device. The processing device may be configured to perform the functions of the computing system 200 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing system 200 may also include a memory 206. The memory 206 may be configured to store data for use by the computing system 200 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the computing system 200 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein. The memory 206 may be configured to store, for example, cryptographic keys, salts, nonces, communication information for the back-end system, etc.

The memory 206 may be configured to store a blockchain. As discussed above, the blockchain may be comprised of a plurality of blocks, where each block may be comprised of at least a block header and one or more data values. Each block header may include a time stamp, a block reference value referring to the preceding block in the blockchain, and a data reference value referring to the one or more data values included in the respective block. The memory may also be configured to store any additional data that may be used by the computing system 200 in performing the functions discussed herein, such as transactions associated with the blockchain, communication data between the first computing node 102 and the second computing nodes 104a-n of the blockchain network, access data for providing access to the blockchain data by the first computing node 102 and the second computing nodes 104a-n, public keys corresponding to private keys provisioned to the first computing node 102 and the second computing nodes 104a-n for verification of digital signatures, etc.

The computing system 200 may include a querying module 214. The querying module 214 may be configured to execute queries on databases to identify information. The querying module 214 may receive one or more data values or query strings, and may execute a query string based thereon on an indicated database, such as the memory 206 of the computing system 200 to identify information stored therein. The querying module 214 may then output the identified information to an appropriate engine or module of the computing system 200 as necessary. The querying module 214 may, for example, execute a query on the memory 206 of the computing system 200 to identify the difficulty level associated with a complex mathematical problem, such as generating a hash with a requisite number of leading zeroes, for a given block of transactions. The querying model 214 may also, for example, execute a query on the memory 206 of the computing system 200 to compare the difficulty levels associated with a previously solved complex mathematical by the first computing node 102 and a current complex mathematical problem being solved by the first computing node 102.

The computing system 200 may also include a generation module 216. The generation module 216 may be configured to generate data for use by the computing system 200 in performing the functions discussed herein. The generation module 216 may receive instructions as input, may generate data based on the instructions, and may output the generated data to one or more modules of the computing system 200. For example, the generation module 216 may be configured to generate a hash, e.g., a proof-of-work, with a required number of leading zeroes for a group of transactions to be added to a blockchain by the first computing node 102.

The computing system 200 may also include a validation module 218. The validation module 218 may be configured to perform validations for the computing system 200 as part of the functions discussed herein. The validation module 218 may receive instructions as input, which may include data to be validated and/or data to be used in the validation. The validation module 218 may perform a validation as requested and may output a result of the validation to another module or engine of the computing system 200. The validation module 218 may, for example, be configured to validate a hash generated by the first computing node 102 by checking that the hash contains the correct number of leading zeroes.

The computing system 200 may also include a transmitting device 220. The transmitting device 220 may be configured to transmit data over one or more networks via one or more network protocols. In some instances, the transmitting device 220 may be configured to transmit data to the first computing node 102, the second computing nodes 104a-n, the network 106 and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to the second computing nodes 104a-n that are superimposed or otherwise encoded with one or more proofs-of-work, which may include a hash value with an associated difficulty, and data transactions associated with a blockchain network. The transmitting device 220 may also be configured to electronically transmit data signals to the first computing node 102 that may be superimposed or otherwise encoded with one or more proofs-of-work, which may include a hash value with an associated difficulty, and data transactions associated with a blockchain network.

Exemplary Method for Enabling Faster Proof of Work in a Distributed Ledger

Figure 3A:
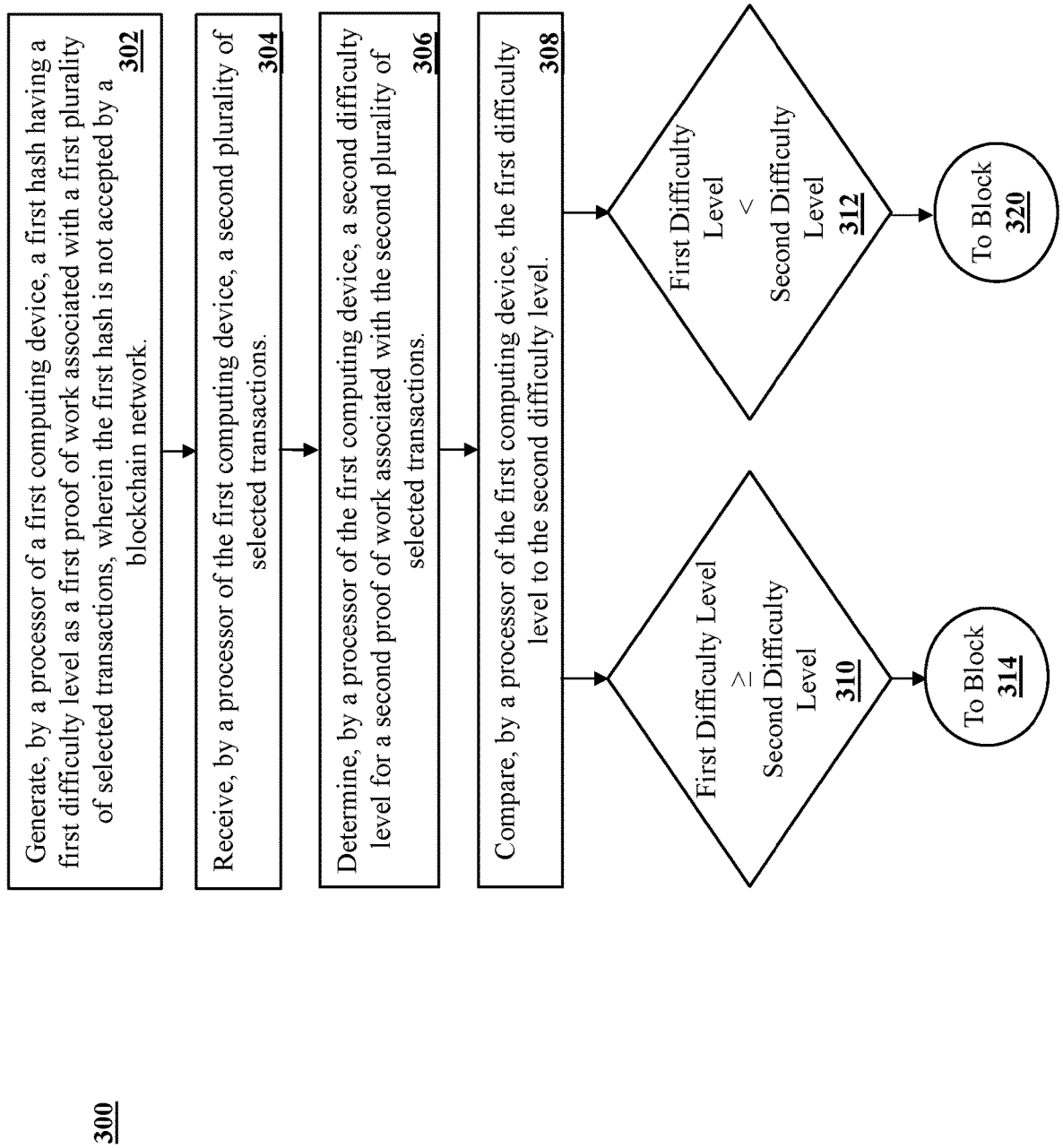
FIG. 3a is a flow chart illustrating exemplary methods for enabling faster proof-of-work in a distributed ledger in accordance with exemplary embodiments.
Figure 3B:
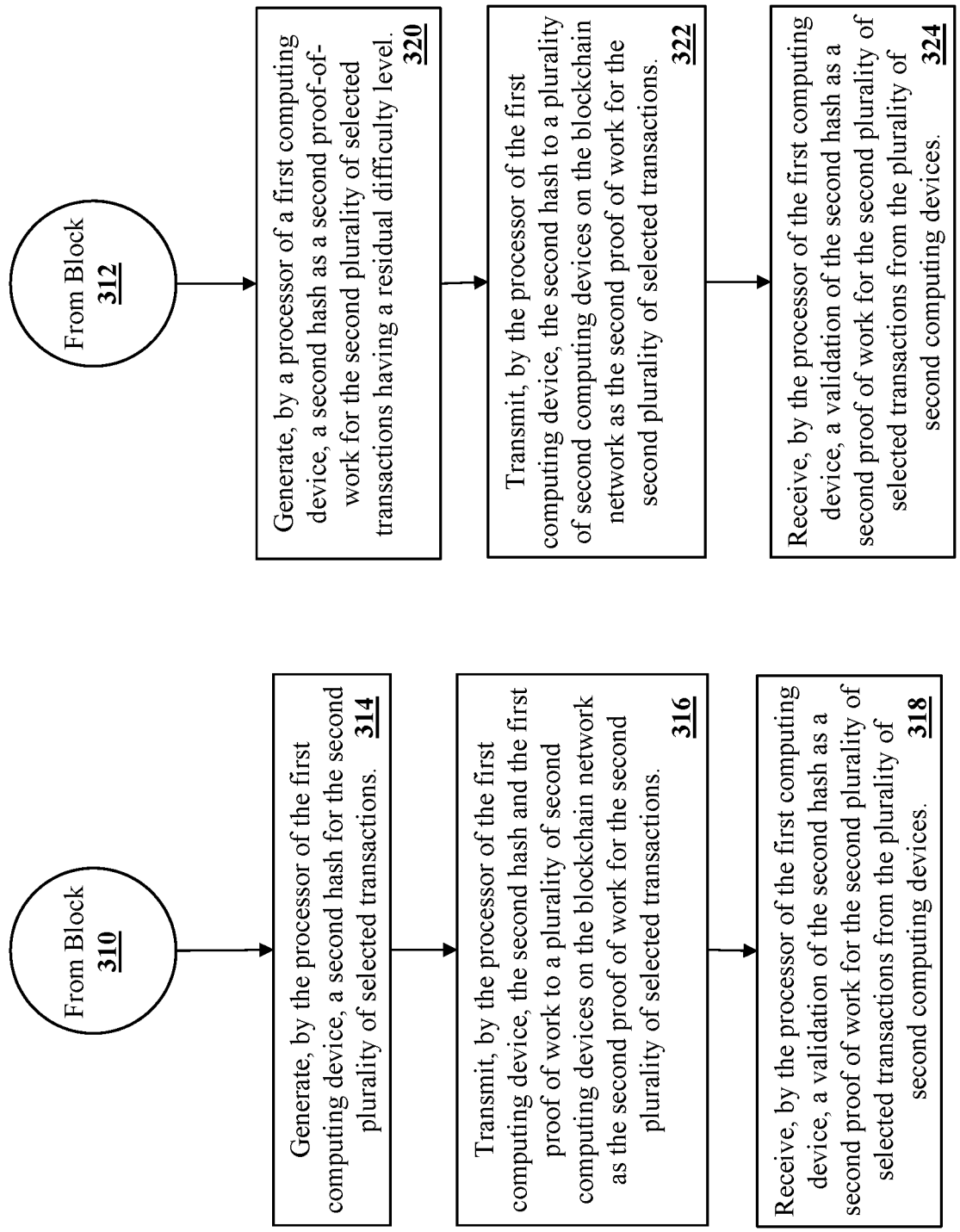
FIG. 3b is a flow chart illustrating exemplary methods for enabling faster proof-of-work in a distributed ledger in accordance with exemplary embodiments.

FIGS. 3a-3b illustrate a method 300 for enabling faster proof-of-work in a distributed ledger in the perspective of the first computing node 102 in the system 100 of FIG. 1.

In block 302, a computing node (e.g., the first computing node 102) generates (e.g., via the generation module 216) a first hash having a first difficulty level as a first proof-of-work associated with a first plurality of selected transactions, wherein the first hash is not accepted by a blockchain network.

In block 304, the computing node (e.g., the first computing node 102) receives (e.g., via the receiving device 202) a second plurality of selected transactions.

In block 306, the computing node (e.g., the first computing node 102) determines (e.g., by a query executed by the querying module 214) a second difficulty level for a second proof-of-work associated with the second plurality of selected transactions.

In block 308, the computing node (e.g., the first computing node 102) compares the first difficulty level to the second difficulty level.

In block 310, if the computing node (e.g., the first computing node 102) determines (e.g., by a query executed by the querying module 214) that the first difficulty level is greater than or equal to the second difficulty level, the computing node will proceed to blocks 314-318.

In block 312, if the computing node (e.g., the first computing node 102) determines that the first difficulty level is less than the second difficulty level, the computing node will proceed to blocks 320-324.

In block 314, the computing node (e.g., the first computing node 102) generates (e.g., via the generation module 216) a second hash for the second plurality of selected transactions.

In block 316, the computing node (e.g., the first computing node 102) transmits (e.g., via the transmitting device 220) the second hash and the first proof of work to a plurality of second computing devices (e.g., the second computing nodes 104a-n) on the blockchain network as the second proof of work for the second plurality of selected transactions.

In block 318, the computing node (e.g., the first computing node 102) receives (e.g., via the receiving device 202) a validation of the second hash as a second proof of work for the second plurality of selected transactions from the plurality of second computing devices.

In block 320, the computing node (e.g., the first computing node 102) generates (e.g., via the generation module 216) a second hash as a second proof-of-work for the second plurality of selected transactions having a residual difficulty level.

In block 322, the computing node (e.g., the first computing node 102) transmits (e.g., via the transmitting device 220) the second hash to a plurality of second computing devices (e.g., the second computing nodes 104a-n) on the blockchain network as the second proof-of-work for the second plurality of selected transactions.

In block 324, the computing node (e.g., the first computing node 102) receives (e.g., via the receiving device 202) a validation of the second hash as a second proof of work for the second plurality of selected transactions from the plurality of second computing devices.

Computer System Architecture

Figure 4:
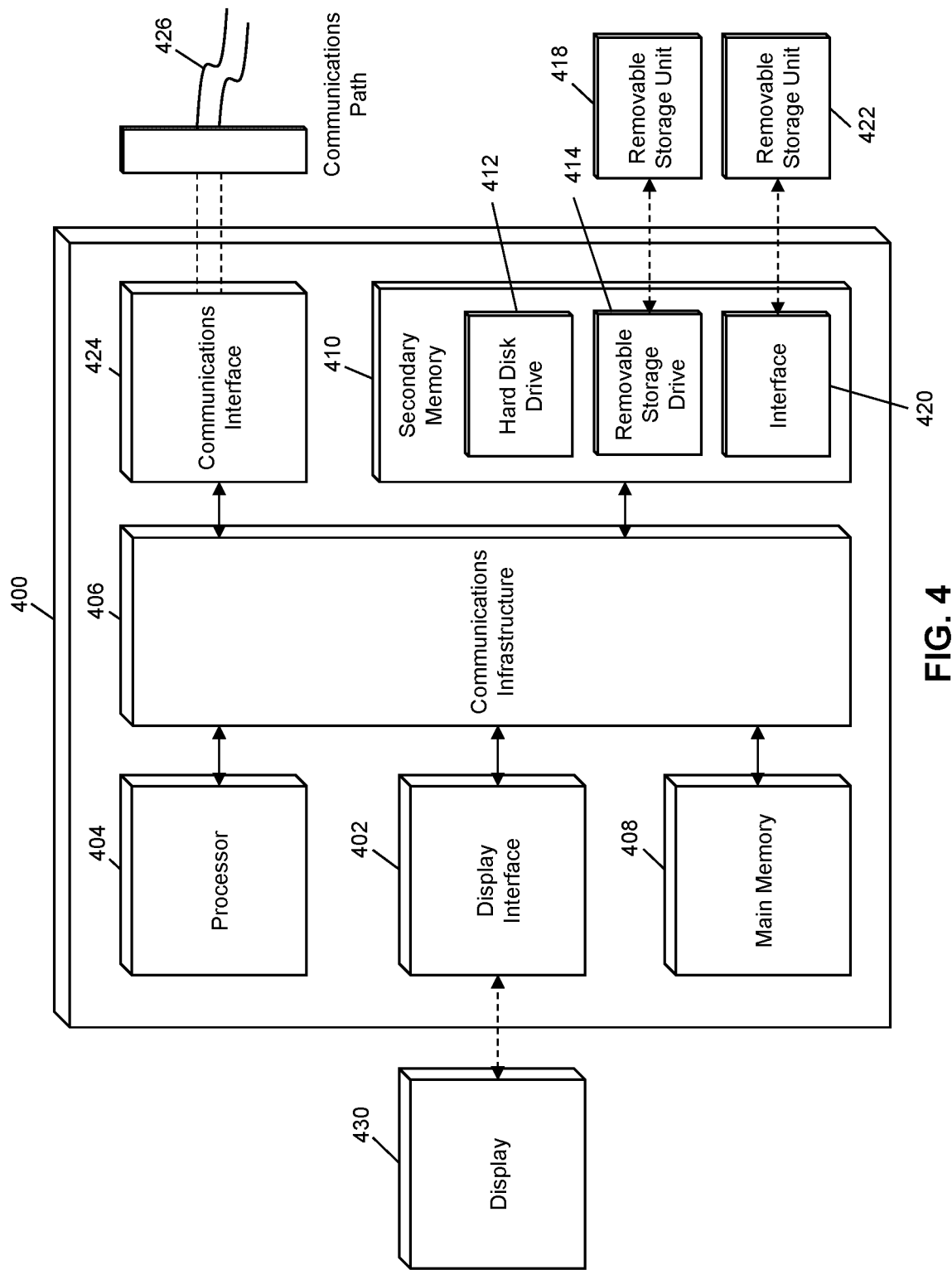
FIG. 4 is a block diagram illustrating a computer system architecture in accordance with exemplary embodiments.

FIG. 4 illustrates a computer system 400 in which embodiments of the present disclosure, or portions thereof, may be implemented as computer-readable code. For example, the first computing node 102 and the second computing nodes 104a-n of FIG. 1 and the computing system 200 of FIG. 2 may be implemented in the computer system 400 using hardware, software executed on hardware, firmware, non-transitory computer readable media having instructions stored thereon, or a combination thereof and may be implemented in one or more computer systems or other processing systems. Hardware, software, or any combination thereof may embody modules and components used to implement the methods of FIGS. 3a-3b.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 418, a removable storage unit 422, and a hard disk installed in hard disk drive 412.

Various embodiments of the present disclosure are described in terms of this example computer system 400. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 404 may be a special purpose or a general purpose processor device specifically configured to perform the functions discussed herein. The processor device 404 may be connected to a communications infrastructure 406, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 400 may also include a main memory 408 (e.g., random access memory, read-only memory, etc.), and may also include a secondary memory 410. The secondary memory 410 may include the hard disk drive 412 and a removable storage drive 414, such as a floppy disk drive, a magnetic tape drive, an optical disk drive, a flash memory, etc.

The removable storage drive 414 may read from and/or write to the removable storage unit 418 in a well-known manner. The removable storage unit 418 may include a removable storage media that may be read by and written to by the removable storage drive 414. For example, if the removable storage drive 414 is a floppy disk drive or universal serial bus port, the removable storage unit 418 may be a floppy disk or portable flash drive, respectively. In one embodiment, the removable storage unit 418 may be non-transitory computer readable recording media.

In some embodiments, the secondary memory 410 may include alternative means for allowing computer programs or other instructions to be loaded into the computer system 400, for example, the removable storage unit 422 and an interface 420. Examples of such means may include a program cartridge and cartridge interface (e.g., as found in video game systems), a removable memory chip (e.g., EEPROM, PROM, etc.) and associated socket, and other removable storage units 422 and interfaces 420 as will be apparent to persons having skill in the relevant art.

Data stored in the computer system 400 (e.g., in the main memory 408 and/or the secondary memory 410) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 400 may also include a communications interface 424. The communications interface 424 may be configured to allow software and data to be transferred between the computer system 400 and external devices. Exemplary communications interfaces 424 may include a modem, a network interface (e.g., an Ethernet card), a communications port, a PCMCIA slot and card, etc. Software and data transferred via the communications interface 424 may be in the form of signals, which may be electronic, electromagnetic, optical, or other signals as will be apparent to persons having skill in the relevant art. The signals may travel via a communications path 426, which may be configured to carry the signals and may be implemented using wire, cable, fiber optics, a phone line, a cellular phone link, a radio frequency link, etc.

The computer system 400 may further include a display interface 402. The display interface 402 may be configured to allow data to be transferred between the computer system 400 and external display 430. Exemplary display interfaces 402 may include high-definition multimedia interface (HDMI), digital visual interface (DVI), video graphics array (VGA), etc. The display 430 may be any suitable type of display for displaying data transmitted via the display interface 402 of the computer system 400, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 408 and secondary memory 410, which may be memory semiconductors (e.g., DRAMs, etc.). These computer program products may be means for providing software to the computer system 400. Computer programs (e.g., computer control logic) may be stored in the main memory 408 and/or the secondary memory 410. Computer programs may also be received via the communications interface 424. Such computer programs, when executed, may enable computer system 400 to implement the present methods as discussed herein. In particular, the computer programs, when executed, may enable processor device 404 to implement the methods illustrated by FIGS. 3*a*-3*b*, as discussed herein. Accordingly, such computer programs may represent controllers of the computer system 400. Where the present disclosure is implemented using software, the software may be stored in a computer program product and loaded into the computer system 400 using the removable storage drive 414, interface 420, and hard disk drive 412, or communications interface 424.

The processor device 404 may comprise one or more modules or engines configured to perform the functions of the computer system 400. Each of the modules or engines may be implemented using hardware and, in some instances, may also utilize software, such as corresponding to program code and/or programs stored in the main memory 408 or secondary memory 410. In such instances, program code may be compiled by the processor device 404 (e.g., by a compiling module or engine) prior to execution by the hardware of the computer system 400. For example, the program code may be source code written in a programming language that is translated into a lower level language, such as assembly language or machine code, for execution by the processor device 404 and/or any additional hardware components of the computer system 400. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 400 to perform the functions disclosed herein. It will be apparent to persons having skill in the relevant art that such processes result in the computer system 400 being a specially configured computer system 400 uniquely programmed to perform the functions discussed above.

Techniques consistent with the present disclosure provide, among other features, systems and methods for authentication of a client device using a hash chain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for enabling faster proof-of-work in a distributed ledger, the method comprising:
generating, by a first computing device, a first hash having a first difficulty level as a first proof of work associated with a first plurality of selected transactions, wherein the first hash is not accepted by a distributed ledger network;
receiving, by the first computing device, a second plurality of selected transactions;
determining, by the first computing device, a second difficulty level for a second proof of work associated with the second plurality of selected transactions;
comparing, by a processor of the first computing device, the first difficulty level to the second difficulty level; and
in response to determining that the first difficulty level is less than the second difficulty level, generating, by the first computing device, a second hash as a second proof-of-work for the second plurality of selected transactions having a residual difficulty level.

2. A method as in claim 1, further comprising:
transmitting, by the first computing device, the second hash to a plurality of second computing devices on the distributed ledger network as the second proof of work for the second plurality of selected transactions, and
receiving, by the first computing device, a validation of the second hash as a second proof of work for the second plurality of selected transactions from the plurality of second computing devices.

3. A method as in claim 1, wherein the residual difficulty level is equal to the difference between an average hashpower associated with the first difficulty level and an average hashpower associated with the second difficulty level.

4. A method as in claim 1, wherein the residual difficulty is equal to an average hashpower associated with the first difficulty level.

5. A method as in claim 1, wherein the residual difficulty level is equal to the difference between a number of leading zeroes for a hash having the first difficulty level and a number of leading zeroes for a hash having the second difficulty level.

6. A method as in claim 1, wherein the residual difficulty is equal to a number of leading zeroes for a hash having the first difficulty level.

7. A method for enabling faster proof-of-work in a distributed ledger, the method comprising:
generating, by a first computing device, a first hash having a first difficulty level as a first proof of work associated with a first plurality of selected transactions, wherein the first hash is not accepted by a distributed ledger network;

receiving, by the first computing device, a second plurality of selected transactions;

determining, by the first computing device, a second difficulty level for a second proof of work associated with the second plurality of selected transactions;

comparing, by a processor of the first computing device, the first difficulty level to the second difficulty level; and in response to determining that the first difficulty level is greater than or equal to the second difficulty level, generating, by the first computing device, a second hash for the second plurality of selected transactions.

8. A method as in claim 7, further comprising:

transmitting, by the first computing device, the second hash and the first proof of work to a plurality of second computing devices on the distributed ledger network as the second proof of work for the second plurality of selected transactions, and receiving, by the first computing device, a validation of the second hash as a second proof of work for the second plurality of selected transactions from the plurality of second computing devices.

9. A system for enabling faster proof-of-work in a distributed ledger, the system comprising:

one or more processors, one or more computer-readable memories, one or more computer-readable tangible storage devices, and instructions stored on at least one of the one or more storage devices for execution by at least one of the one or more processors via at least one of the one or more memories, the instructions comprising:

instructions to generate, first computing device, a first hash having a first difficulty level as a first proof of work associated with a first plurality of selected transactions, wherein the first hash is not accepted by a distributed ledger network;

instructions to receive, by the first computing device, a second plurality of selected transactions;

instructions to determine, by the first computing device, a second difficulty level for a second proof of work associated with the second plurality of selected transactions;

instructions to compare, by a processor of the first computing device, the first difficulty level to the second difficulty level; and in response to determining that the first difficulty level is less than the second difficulty level, instructions to generate, by the first computing device, a second hash as a second proof-of-work for the second plurality of selected transactions having a residual difficulty level.

10. A system as in claim 9, further comprising:

instructions to transmit, by the first computing device, the second hash to a plurality of second computing devices on the distributed ledger network as the second proof of work for the second plurality of selected transactions, and instructions to receive, by the first computing device, a validation of the second hash as a second proof-of work for the second plurality of selected transactions from the plurality of second computing devices.

11. A system as in claim 9, further comprising:

in response to determining that the first difficulty level is greater than or equal to the second difficulty level, instructions to generate, by the first computing device, a second hash for the second plurality of selected transactions.

12. A system as in claim 9, wherein the residual difficulty level is equal to the difference between an average hashpower associated with the first difficulty level and an average hashpower associated with the second difficulty level.

13. A system as in claim 9, wherein the residual difficulty is equal to an average hashpower associated with the first difficulty level.

14. A system as in claim 9, wherein the residual difficulty level is equal to the difference between a number of leading zeroes for a hash having the first difficulty level and a number of leading zeroes for a hash having the second difficulty level.

15. A system as in claim 9, wherein the residual difficulty is equal to a number of leading zeroes for a hash having the first difficulty level.

* * * * *